(12) United States Patent
Jenkins et al.

(10) Patent No.: US 11,503,389 B2
(45) Date of Patent: Nov. 15, 2022

(54) SPEAKER ASSEMBLY WITH RESILIENT MOUNTING ARRANGEMENT FOR A VEHICLE AND ASSOCIATED METHODS

(71) Applicant: VOXX INTERNATIONAL CORPORATION, Hauppauge, NY (US)

(72) Inventors: Todd Jenkins, Sanford, FL (US); Jonathan Reiblich, Winter Springs, FL (US)

(73) Assignee: VOXX INTERNATIONAL CORPORATION, Hauppauge, NY (US)

( * ) Notice: Subject to any disclaimer, the term of this patent is extended or adjusted under 35 U.S.C. 154(b) by 0 days.

(21) Appl. No.: 17/205,551

(22) Filed: Mar. 18, 2021

(65) Prior Publication Data

US 2022/0303650 A1 Sep. 22, 2022

(51) Int. Cl.
*H04R 1/02* (2006.01)
*B60R 11/02* (2006.01)
(Continued)

(52) U.S. Cl.
CPC .......... *H04R 1/026* (2013.01); *B60R 11/0217* (2013.01); *H04R 1/025* (2013.01); *H04R 1/403* (2013.01); *H04R 3/12* (2013.01); *B60R 2011/005* (2013.01); *H04R 2400/11* (2013.01); *H04R 2420/07* (2013.01); *H04R 2499/13* (2013.01)

(58) Field of Classification Search
CPC ........ H04R 1/026; H04R 1/025; H04R 1/403; H04R 3/12; H04R 2400/11; H04R 2499/13; H04R 2201/028; H04R 1/02

USPC ................... 381/86, 302, 309, 332–336, 386
See application file for complete search history.

(56) References Cited

U.S. PATENT DOCUMENTS 6,397,988 B1 * 6/2002 Ptak ........................ F16F 1/505
174/42
6,690,802 B2 * 2/2004 Stickles ................. H04R 27/00
381/387
(Continued)

FOREIGN PATENT DOCUMENTS

CN 201657247 11/2010
CN 204795541 11/2015
(Continued)

*Primary Examiner* — Disler Paul
(74) *Attorney, Agent, or Firm* — Allen, Dyer, Doppelt + Gilchrist, P.A.

(57) ABSTRACT

A speaker assembly may be for being resiliently mounted to spaced apart frame members of a vehicle. The speaker assembly may include an elongate housing having a respective retention chamber at each opposing end, and audio speakers and associated wireless receiver circuitry carried by the housing. The speaker assembly may also include a respective inboard elastomeric body within each retention chamber, and a respective vehicle frame mounting bracket at each end of the elongate housing and to be mounted to an adjacent frame member of the vehicle. The assembly may further include respective fasteners coupling each vehicle frame mounting bracket to the elongate housing via a corresponding inboard elastomeric body so that each vehicle frame mounting bracket is resiliently coupled to the elongate housing.

22 Claims, 6 Drawing Sheets

(51) Int. Cl.
*H04R 1/40* (2006.01)
*H04R 3/12* (2006.01)
*B60R 11/00* (2006.01)

(56) References Cited

U.S. PATENT DOCUMENTS

| | | |
|---|---|---|
| 8,568,182 B2 | 10/2013 | White et al. |
| 9,469,254 B1 | 10/2016 | White et al. |
| 9,930,444 B1* | 3/2018 | Stanley ..................... F21V 3/00 |
| 10,471,903 B1* | 11/2019 | Jordan ................ F21V 33/0056 |
| 10,486,613 B2 | 11/2019 | White et al. |
| 11,285,885 B1* | 3/2022 | Jordan ................... H04R 1/026 |
| 2019/0208298 A1 | 7/2019 | Winton et al. |

FOREIGN PATENT DOCUMENTS

| | | |
|---|---|---|
| CN | 208798173 | 4/2019 |
| CN | 208891000 | 5/2019 |
| CN | 211089932 | 7/2020 |

* cited by examiner

SPEAKER ASSEMBLY WITH RESILIENT MOUNTING ARRANGEMENT FOR A VEHICLE AND ASSOCIATED METHODS

FIELD OF THE INVENTION

The present invention relates to audio devices, and, more particularly, to a speaker assembly, such as for a vehicle and related methods.

BACKGROUND

Speaker assemblies, or soundbars, are often used to provide audio entertainment for users. A typical speaker assembly, such as for a vehicle like a golf cart, may include a housing that is mounted to the frame members of the golf cart. Speakers are enclosed within the housing and associated wireless circuitry may be used to play audio from a remote source, such as a cellphone of the user.

A number of approaches have been taken to mounting a speaker assembly to a vehicle, such as a watercraft or land vehicle. For example, U.S. Pat. No. 10,471,903 discloses a housing with L-shaped mounting brackets coupled to opposing ends of an elongate housing. U.S. Pat. No. 10,486,613 also discloses a soundbar mounting arrangement including L-shaped bracket members at opposing ends of the elongate speaker housing. U.S. Published Patent Application No. 2019/0208298 discloses a soundbar having a bracket that extends along the entire length of the speaker housing.

Despite the variety of mounting arrangements, mounting the speaker assembly to a vehicle may prove challenging because not only does the vehicle move, but the frame members to which the assembly is mounted may also move relative to one another.

SUMMARY

In general, a speaker assembly may include a mounting arrangement to resiliently mount the speaker assembly to spaced apart frame members of a vehicle. The speaker assembly may comprise an elongate housing having a respective retention chamber at each opposing end, and a plurality of audio speakers and associated wireless receiver circuitry carried by the elongate housing. In addition, the speaker assembly may also include a respective inboard elastomeric body within each retention chamber. A respective vehicle frame mounting bracket may be at each end of the elongate housing and to be mounted to an adjacent frame member of the vehicle.

A respective plurality of fasteners may couple each vehicle frame mounting bracket to the elongate housing via a corresponding inboard elastomeric body so that each vehicle frame mounting bracket is resiliently coupled to the elongate housing. Accordingly, the speaker assembly may be resiliently and securely mounted to the frame members of the vehicle. The mounting arrangement may significantly reduce squeaks, rattles, and potential damage to the housing, or its internal components, as the vehicle moves, and the frame members move relative to one another.

The speaker assembly may also include a respective outboard elastomeric body between each vehicle frame mounting bracket and the elongate housing so that the corresponding vehicle frame mounting bracket serves as an outboard backing plate for outboard ends of the respective plurality of elongate fasteners. A respective inboard backing plate may also be provided between each inboard elastomeric body and inboard ends of the respective plurality of fasteners.

Each inboard elastomeric body may comprise a base and a plurality of legs extending outwardly therefrom, for example. In addition, each leg may have a fastener-receiving passageway extending therethrough, and receiving a corresponding fastener therein. In some embodiments, each vehicle frame mounting bracket may have a U-shaped base and an elongate arm extending outwardly therefrom.

The speaker assembly may also include a user interface panel carried by the elongate housing and coupled to the wireless receiver circuitry. In some embodiments, at least one light may be carried by the user interface panel.

The wireless receiver circuitry may comprise Bluetooth receiver circuitry, for example. The speaker assembly may also be used for applications where the spaced apart frame members support a vehicle roof, such as for a golf cart, or Utility Task Vehicle (UTV), or All Terrain Vehicle (ATF).

A method aspect is for making a speaker assembly to be mounted to spaced apart frame members of a vehicle. The method may include positioning a plurality of audio speakers and associated wireless receiver circuitry within an elongate housing having a retention chamber at each opposing end, and positioning a respective inboard elastomeric body within each retention chamber. The method may also include coupling a respective vehicle frame mounting bracket at each end of the elongate housing using a respective plurality of fasteners coupling each frame mounting bracket to the elongate housing via a corresponding inboard elastomeric body so that each vehicle frame mounting bracket is resiliently coupled to the elongate housing.

DETAILED DESCRIPTION OF THE EMBODIMENTS

The present invention will now be described more fully hereinafter with reference to the accompanying drawings in which preferred embodiments of the invention are shown. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout.

Figure 1:
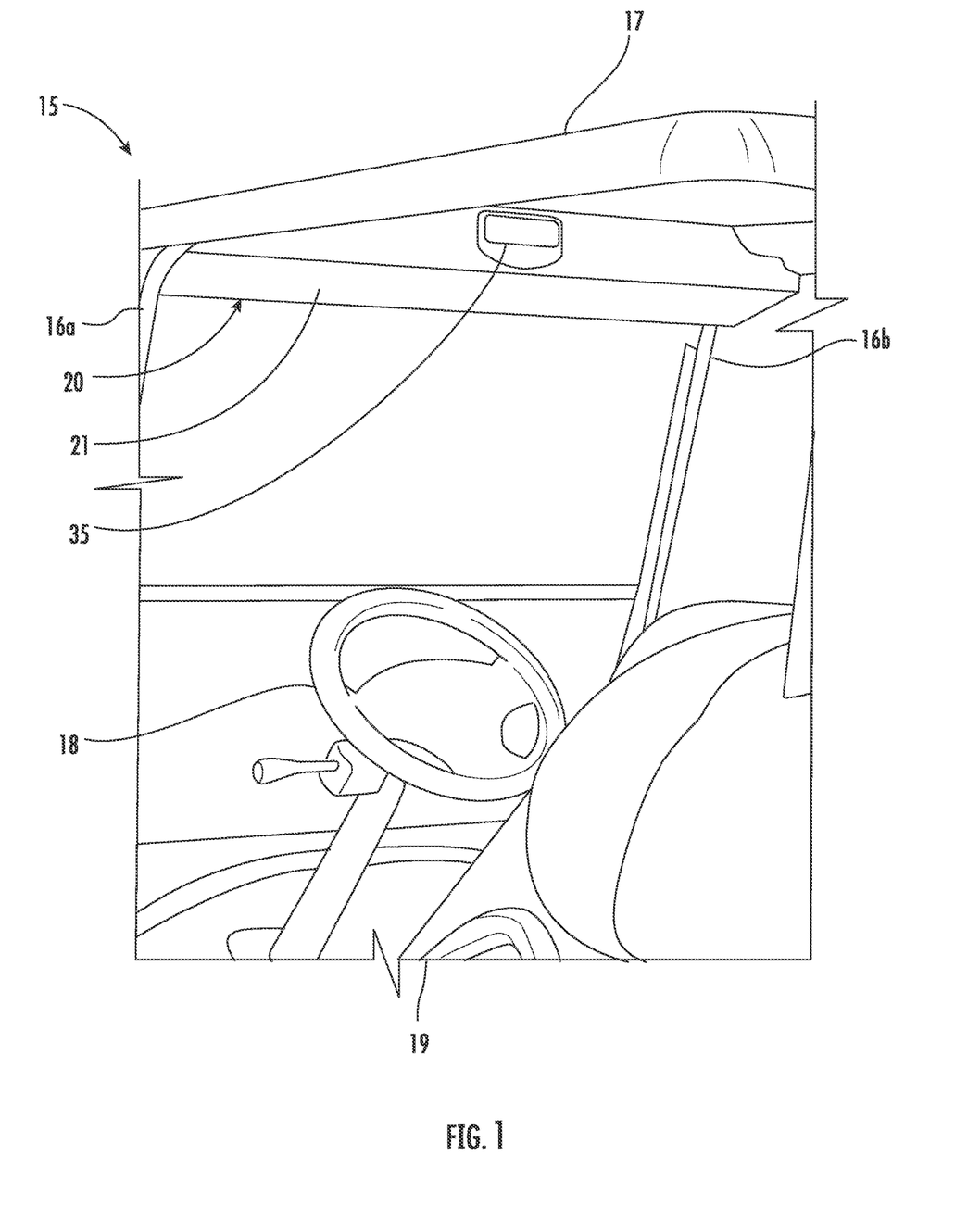
FIG. 1 is a perspective view of the speaker assembly mounted to a golf cart according to an embodiment of the invention.
Figure 2:
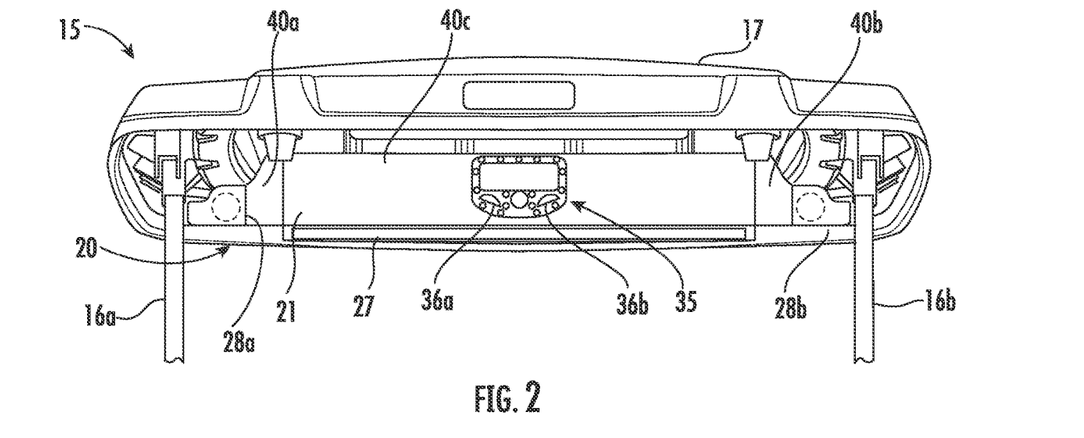
FIG. 2 is a front view of the speaker assembly as shown in FIG. 1.

With reference to FIGS. 1-2 an embodiment of the speaker assembly 20 is first described. The speaker assembly 20 is illustratively mounted within a forward portion of a golf cart 15 just beneath the roof 17 of the golf cart. The speaker assembly 20 is mounted at its opposing ends to spaced apart frame members 16a, 16b of the golf cart that support the roof 17. The frame members 16a, 16b extend upwardly from the vehicle body, curve and then extend horizontally rearward before curving back down and being joined to the rear of the golf cart. The golf cart 15 also includes a steering wheel 18 and driver seat 19. Accordingly, the speaker assembly 20 is positioned to provide audio entertainment to the driver and any passengers of the golf cart 15.

As will be appreciated by those skilled in the art, the speaker assembly 20 may be used on many different types of vehicles including land vehicles, such as golf carts, ATVs, UTVs, etc., as well as similar watercraft. As described above, the speaker assembly 20 is subject to shock, vibration, and other forces, unlike a fixed application, such as in the home. In other words, the speaker assembly 20 resilient mounting arrangement as described in greater detail below is configured to significantly reduce squeaks, rattles, and potential damage as the vehicle is operated and the frame members move relative to one another.

Figure 3:
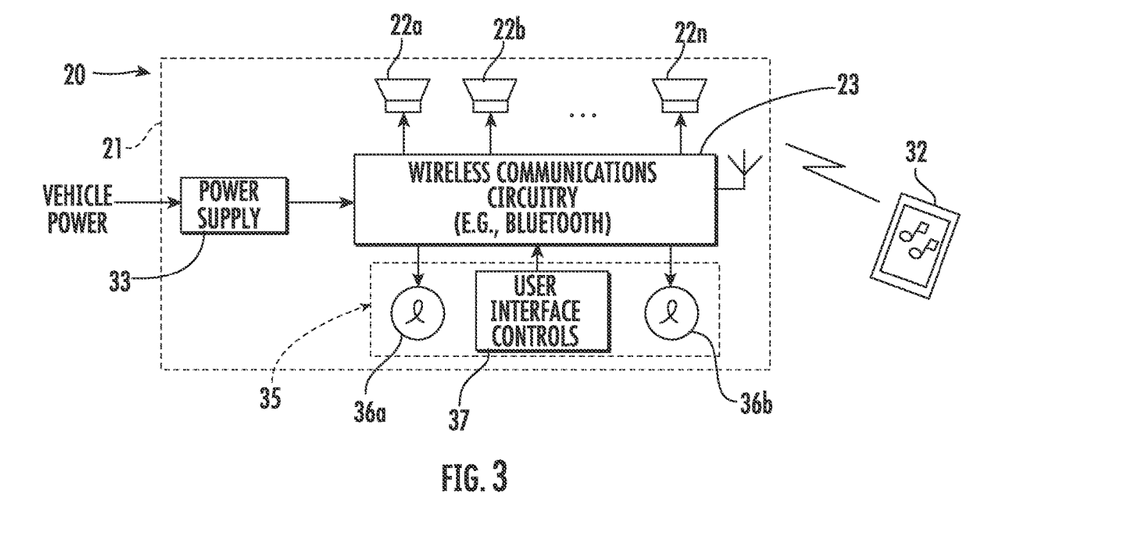
FIG. 3 is a schematic block diagram of the speaker assembly of FIG. 1.
Figure 4:
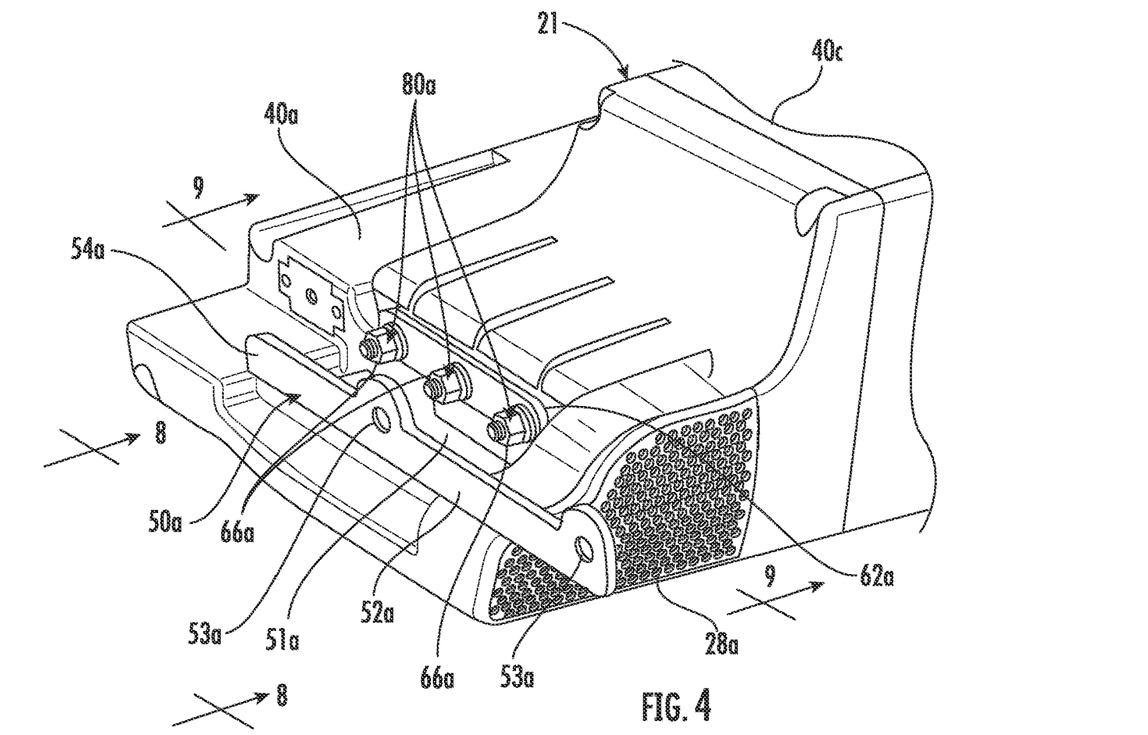
FIG. 4 is a front perspective view of a left end of the speaker assembly as shown in FIG. 1.
Figure 5:
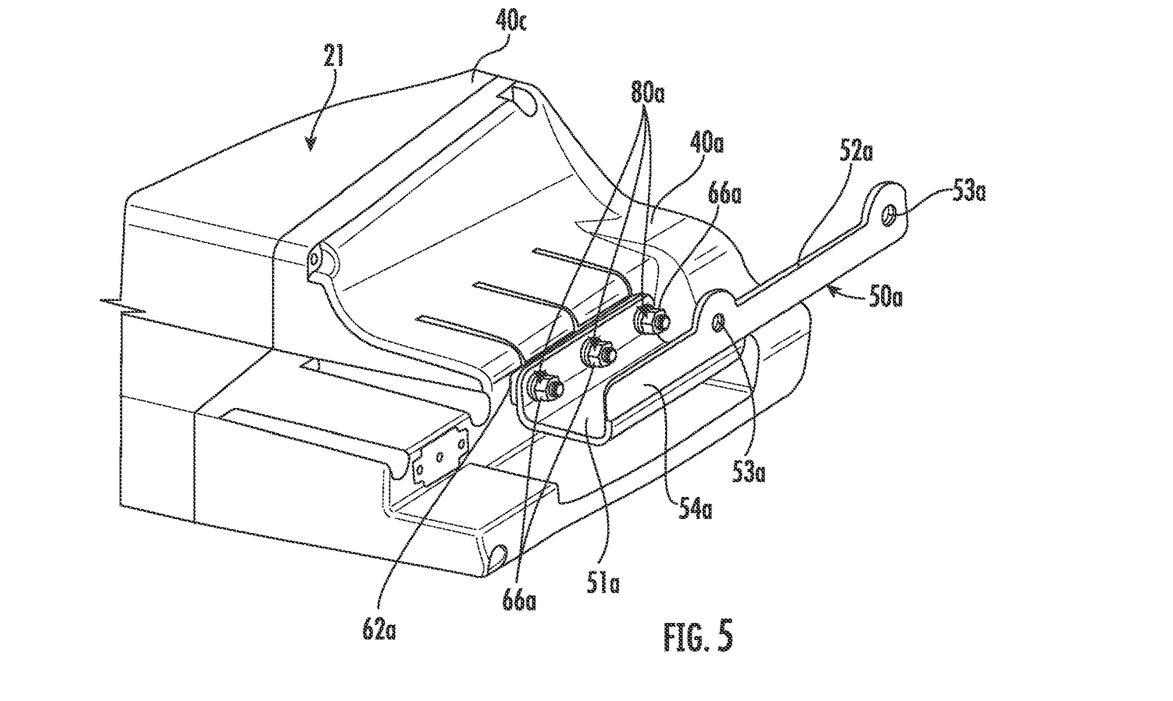
FIG. 5 is a rear perspective view of the left end of the speaker assembly as shown in FIG. 4.
Figure 6:
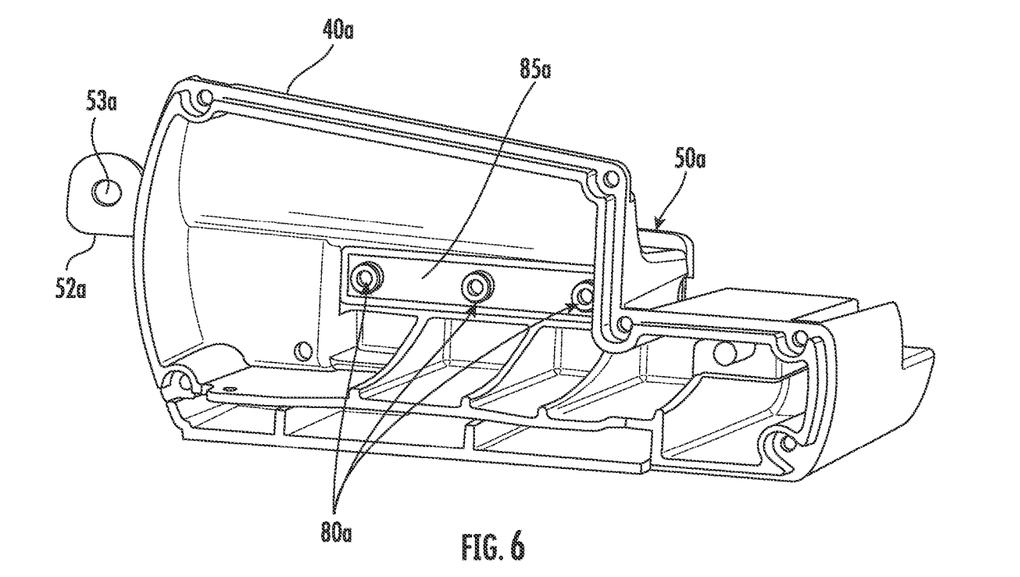
FIG. 6 is an interior view of an endcap of the left end of the housing of the speaker assembly as shown in FIGS. 4 and 5.
Figure 7:
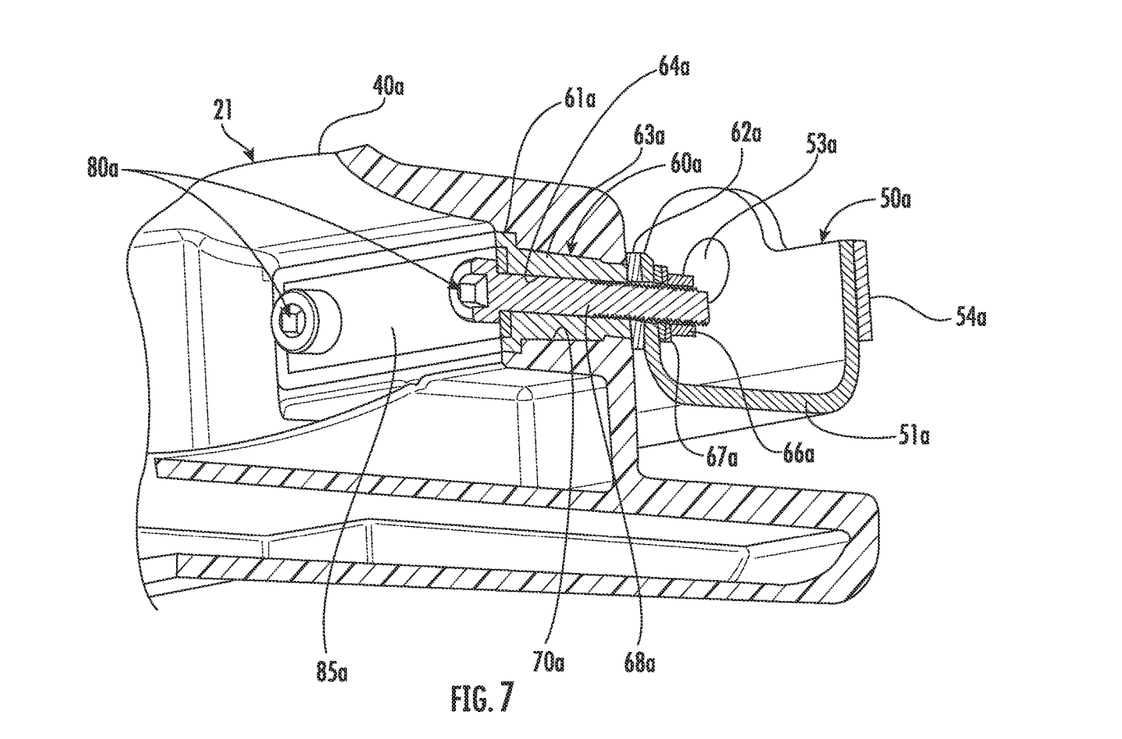
FIG. 7 is a fragmentary view of the endcap of the housing of the speaker assembly as shown in FIG. 6.
Figure 8:
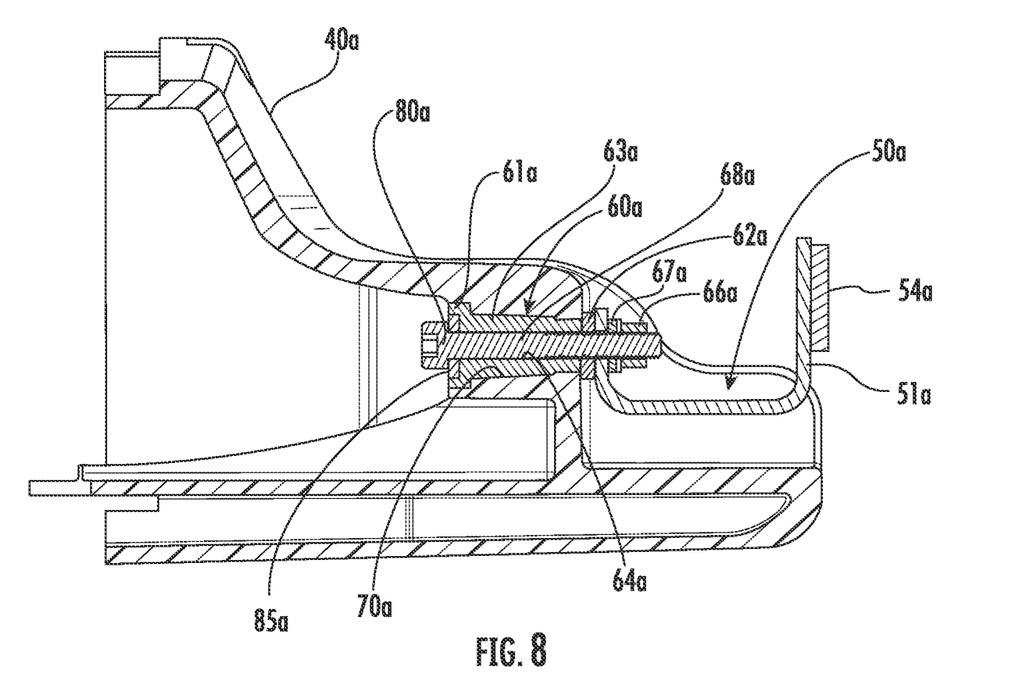
FIG. 8 is a cross-sectional view of the endcap of the housing of the speaker assembly as shown taken along lines 8-8 of FIG. 4.
Figure 9:
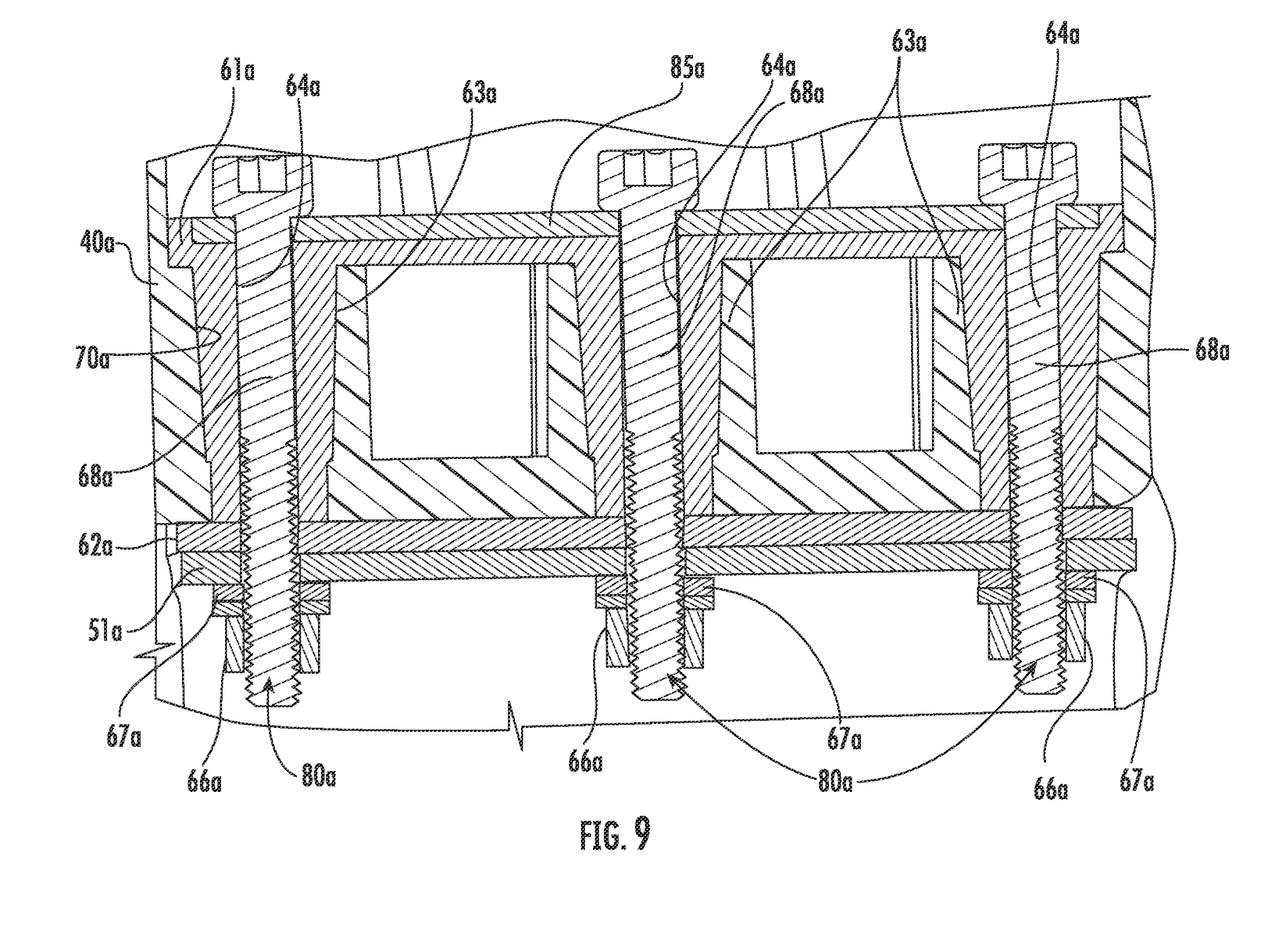
FIG. 9 is a cross-sectional view of a portion of the endcap of the housing of the speaker assembly as shown taken along lines 9-9 of FIG. 4.

Referring now additionally to the block diagram of FIG. 3, additional features of the speaker assembly 20 are now described. The speaker assembly 20 illustratively includes an elongate housing 21, and a plurality of audio speakers 22a, 22b, 22n and associated wireless receiver circuitry 23 carried by the elongate housing. The wireless receiver circuitry 23 may include a Bluetooth wireless transceiver and associated audio amplifier for driving the speakers 22a, 22b, 22n. Other short-range wireless communications technologies may also be used, such as WiFi, for example.

The audio speakers 22a, 22b, 22n may be directed downward through a bottom grill 27 of the housing 20 and/or may be directed through wing speaker grills 28a, 28b (FIG. 2). Other configurations of speaker positioning may be provided in other embodiments as will be appreciated by those skilled in the art.

The wireless communications circuitry 23 may communicate with a user-operated short-range wireless device in the form of the illustrated cellular telephone 32. Of course, wired connections may additionally be used in other embodiments.

The speaker assembly 20 also includes a power supply 33 for the wireless communications circuitry 23. The power supply 33 may take the form of a battery contained with the housing 21, or voltage control circuitry powered by an electrical source of the vehicle, or may be a direct connection to an electrical source of the vehicle.

The speaker assembly 20 also includes a user interface panel 35 carried by the elongate housing 21 in a medial portion thereof 40c and coupled to the wireless receiver circuitry 23. In some embodiments, at least one light 36a, 36b may be carried by the user interface panel 35. The user interface panel 35 also includes user interface controls 37 in form of buttons/switches to permit the user to control operation of the speaker assembly 20. As will be appreciated by those skilled in the art, the various electronic components for the speaker assembly 20 may be resistant to water, shock resistant, and be suitable for operation within the temperatures compatible with outdoor use.

The housing 21 in the illustrated embodiment has an elongate shape and includes a medial portion 40c between two opposing ends. As also shown in the illustrated embodiment, the ends of the housing 21 are provided by endcaps 40a, 40b (FIG. 2) separately molded and joined to the medial portion 40c by suitable fasteners, not shown. In other embodiments, the structure of the endcaps may be included along with the medial portion in one or more molded sections as will also be appreciated by those skilled in the art.

Referring now additionally to FIGS. 4-9, the resilient mounting arrangement of the speaker assembly 20 is described in detail. For clarity of explanation, the left endcap 40a and associated mounting bracket 50a are described, and those of skill in the art will appreciate the similar construction of the right endcap 40b and its associated mounting bracket.

In the illustrated embodiment the vehicle frame mounting bracket 50a has a U-shaped base 51a and an elongate arm 52a extending outwardly therefrom. The elongate arm 52a may have one or more openings 53a to receive a fastener, not shown, to secure the elongate arm to the adjacent portions of the vehicle frame member 16a. The vehicle frame mounting bracket 50a may have other shapes in other embodiments, depending on the particular shape and construction of the vehicle frame member 16a. An elastomeric layer 54a may also be added to the elongate arm 52a to further cushion contact with adjacent portions of the vehicle frame, such as to reduce squeaks and rattles, for example.

An inboard elastomeric body 60a is positioned within a retention chamber 70a formed within the endcap 40a. The retention chamber 70a may be readily molded into the plastic endcap 40a as will be appreciated by those skilled in the art.

The inboard elastomeric body 60a illustratively has a base 61a and three legs 63a extending therefrom. Each leg 63a has a corresponding fastener-receiving passageway 64a extending therethrough. In other embodiments, the number of legs 63a could be less or greater than three. In addition, the inboard elastomeric body 60a may be formed as a single molded part or could be provided by several individual parts as will be appreciated by those of skill in the art.

A plurality of elongate fasteners 80a, (three in the illustrated embodiment) in the form of bolts 68a with nuts 66a and associated washers 67a, are used to couple the vehicle frame mounting bracket 50a to the inboard elastomeric body 60a.

An inboard backing plate 85a is positioned between inboard ends of the plurality of elongate fasteners 80a (the bolt heads) and adjacent portions of the inboard elastomeric body 60a, such as the inboard elastomeric body base 61a as in the illustrated embodiment. The inboard backing plate 85a spreads the load to the elastomeric body 60a from the plurality of fasteners 80a.

An outboard elastomeric body 62a is also provided between the vehicle frame mounting bracket 50a and the end cap 40a of the elongate housing 21 so that the vehicle frame mounting bracket serves as an outboard backing plate for outboard ends of the respective plurality of elongate fasteners 80a. In other words, the U-shaped base 51a of the vehicle frame mounting bracket 50a may also serve as an outboard backing plate for outboard ends of the plurality of elongate fasteners 80a.

A method aspect is for making a speaker assembly 20 to be resiliently mounted to spaced apart frame members 16a, 16b of a vehicle, such as the illustrated golf cart 15. The method may include positioning a plurality of audio speakers 22a, 22b, 22n and associated wireless receiver circuitry 23 within an elongate housing 21 having a retention chamber 70a at each opposing end. The method may also include positioning a respective inboard elastomeric body 60a within each retention chamber 70a, and coupling a respective vehicle frame mounting bracket 50a at each end of the elongate housing using a respective plurality of fasteners coupling each frame mounting bracket to the elongate housing via a corresponding inboard elastomeric body so that each vehicle frame mounting bracket is resiliently coupled to the elongate housing 21.

Many modifications and other embodiments of the invention will come to the mind of one skilled in the art having the benefit of the teachings presented in the foregoing descriptions and the associated drawings. Accordingly, it is understood that the invention is not to be limited to the illustrated embodiments disclosed, and that the modifications and embodiments are intended to be included within the spirit and scope of the appended claims.

That which is claimed is:

1. A speaker assembly to be resiliently mounted to spaced apart frame members of a vehicle, the speaker assembly comprising: an elongate housing having a respective retention chamber at each opposing end; a plurality of audio speakers and associated wireless receiver circuitry carried by the elongate housing; a respective inboard elastomeric body within each retention chamber and extending through a wall of the elongate housing; a respective inboard backing plate positioned adjacent each inboard elastomeric body; a respective vehicle frame mounting bracket at each end of the elongate housing and to be mounted to an adjacent frame member of the vehicle; and a respective plurality of fasteners coupling each vehicle frame mounting bracket to a corresponding end of the elongate housing via and extending through the corresponding inboard backing plate and inboard elastomeric body so that each vehicle frame mounting bracket is resiliently coupled to the elongate housing.

2. The speaker assembly of claim 1 comprising a respective outboard elastomeric body between each vehicle frame mounting bracket and the elongate housing so that the corresponding vehicle frame mounting bracket serves as an outboard backing plate for outboard ends of the respective plurality of elongate fasteners.

3. The speaker assembly of claim 1 wherein each inboard elastomeric body comprises a base and a plurality of legs extending outwardly therefrom.

4. The speaker assembly of claim 3 wherein each leg has a fastener-receiving passageway extending therethrough and receiving a corresponding fastener from among the plurality therein.

5. The speaker assembly of claim 1 wherein each vehicle frame mounting bracket has a U-shaped base and an elongate arm extending outwardly therefrom.

6. The speaker assembly of claim 1 comprising a user interface panel carried by the elongate housing and coupled to the wireless receiver circuitry.

7. The speaker assembly of claim 6 comprising at least one light carried by the user interface panel.

8. The speaker assembly of claim 1 wherein the wireless receiver circuitry comprises Bluetooth receiver circuitry.

9. A speaker assembly to be mounted to spaced apart frame members of a vehicle, the speaker assembly comprising: an elongate housing having a respective retention chamber at each opposing end; a plurality of audio speakers and associated wireless receiver circuitry carried by the elongate housing; a respective inboard elastomeric body within each retention chamber and extending through a wall of the elongate housing; a respective inboard backing plate positioned adjacent each inboard elastomeric body; a respective vehicle frame mounting bracket at each end of the elongate housing and to be mounted to an adjacent frame member of the vehicle; a respective plurality of fasteners coupling each vehicle frame mounting bracket to a corresponding end of the elongate housing and extending through the corresponding inboard backing plate and inboard elastomeric body so that each vehicle frame mounting bracket is resiliently coupled to the elongate housing; an a respective outboard elastomeric body between each vehicle frame mounting bracket and the elongate housing so that the corresponding vehicle frame mounting bracket serves as an outboard backing plate for outboard ends of the respective plurality of elongate fasteners.

10. The speaker assembly of claim 9 wherein each inboard elastomeric body comprises a base and a plurality of legs extending outwardly therefrom.

11. The speaker assembly of claim 10 wherein each leg has a fastener-receiving passageway extending therethrough and receiving a corresponding fastener from among the plurality of fasteners therein.

12. The speaker assembly of claim 9 wherein each vehicle frame mounting bracket has a U-shaped base and an elongate arm extending outwardly therefrom.

13. The speaker assembly of claim 9 comprising a user interface panel carried by the elongate housing and coupled to the wireless receiver circuitry.

14. The speaker assembly of claim 13 comprising at least one light carried by the user interface panel.

15. The speaker assembly of claim 9 wherein the wireless receiver circuitry comprises Bluetooth receiver circuitry.

16. A method for making a speaker assembly to be mounted to spaced apart frame members of a vehicle, the method comprising: positioning a plurality of audio speakers and associated wireless receiver circuitry within an elongate housing having a retention chamber at each opposing end; positioning a respective inboard elastomeric body within each retention chamber and extending through a wall of the elongate housing; and positioning a respective inboard backing plate adjacent each inboard elastomeric body; and coupling a respective vehicle frame mounting bracket at each end of the elongate housing using a respective plurality of fasteners coupling each frame mounting bracket to the elongate housing and extending through the corresponding inboard backing plate and inboard elastomeric body so that each vehicle frame mounting bracket is resiliently coupled to the elongate housing.

17. The method of claim 16 comprising positioning a respective outboard elastomeric body between each vehicle frame mounting bracket and the elongate housing so that the corresponding vehicle frame mounting bracket serves as an outboard backing plate for outboard ends of the respective plurality of elongate fasteners.

18. The method of claim 16 wherein each inboard elastomeric body comprises a base and a plurality of legs extending outwardly therefrom.

19. The method of claim 18 wherein each leg has a fastener-receiving passageway extending therethrough and receiving a corresponding fastener from among the plurality of fasteners therein.

20. The method of claim 16 wherein each vehicle frame mounting bracket has a U-shaped base and an elongate arm extending outwardly therefrom.

21. The method of claim 16 comprising positioning a user interface panel carried by the elongate housing and coupled to the wireless receiver circuitry.

22. The method of claim 16 wherein the wireless receiver circuitry comprises Bluetooth receiver circuitry.

* * * * *

UNITED STATES PATENT AND TRADEMARK OFFICE
CERTIFICATE OF CORRECTION

| | |
|---|---|
| PATENT NO. | : 11,503,389 B2 |
| APPLICATION NO. | : 17/205551 |
| DATED | : November 15, 2022 |
| INVENTOR(S) | : Jenkins et al. |

It is certified that error appears in the above-identified patent and that said Letters Patent is hereby corrected as shown below:

In the Claims

Column 5, Line 36   Delete: "via" after "housing"

Column 6, Line 12   Delete: "an"
Insert: --and--

Column 6, Line 43   Delete: "and" after "housing; and"

Signed and Sealed this
Seventh Day of March, 2023

Katherine Kelly Vidal
*Director of the United States Patent and Trademark Office*